United States Patent
Matsusaka

(10) Patent No.: US 9,420,122 B2
(45) Date of Patent: Aug. 16, 2016

(54) IMAGE PROCESSING DEVICE AND IMAGE FORMING APPARATUS

(71) Applicant: KYOCERA Document Solutions Inc., Osaka (JP)

(72) Inventor: Tetsuya Matsusaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/988,345

(22) Filed: Jan. 5, 2016

(65) Prior Publication Data

US 2016/0212280 A1   Jul. 21, 2016

(30) Foreign Application Priority Data

Jan. 15, 2015 (JP) .................... 2015-005995

(51) Int. Cl.
*G06F 15/00* (2006.01)
*H04N 1/00* (2006.01)
*G06F 3/12* (2006.01)

(52) U.S. Cl.
CPC .......... *H04N 1/00204* (2013.01); *G06F 3/1205* (2013.01); *G06F 3/1252* (2013.01); *G06F 3/1286* (2013.01); *H04N 1/0032* (2013.01); *H04N 1/0057* (2013.01); *H04N 1/00411* (2013.01); *H04N 1/00803* (2013.01); *H04N 2201/0094* (2013.01)

(58) Field of Classification Search
USPC ......................................... 358/1.15
See application file for complete search history.

(56) References Cited

U.S. PATENT DOCUMENTS

2011/0145701 A1* 6/2011 Dejean ............ G06F 17/217
715/246

FOREIGN PATENT DOCUMENTS

JP          2013-144404 A     7/2013

* cited by examiner

*Primary Examiner* — Saeid Ebrahimi Dehkord
(74) *Attorney, Agent, or Firm* — Stein IP, LLC

(57) ABSTRACT

An image processing device includes an acquisition unit and an image processing unit. The image processing unit makes a similarity determination for each of pages following a first page, thereby searches for a similar header image resembling a reference header image and a similar footer image resembling a reference footer image, and deletes, from image data of the pages following the first page, image data of a page where a similar footer image exists and a region other than a region where the similar footer image exists is blank.

5 Claims, 9 Drawing Sheets

(1ST PAGE)

(2ND PAGE)

← RECOGNIZED AS SIMILAR HEADER IMAGE (3RD PAGE)

← RECOGNIZED AS SIMILAR FOOTER IMAGE (4TH PAGE)

IMAGE PROCESSING DEVICE AND IMAGE FORMING APPARATUS

INCORPORATION BY REFERENCE

This application is based upon, and claims the benefit of priority from, the corresponding Japanese Patent Application No. 2015-005995 filed on Jan. 15, 2015, the entire contents of which are incorporated herein by reference.

BACKGROUND

The present disclosure relates to an image processing device that performs image processing on image data, and also relates to an image forming apparatus.

A personal computer operated by a user (hereinafter referred to as a user terminal) is communicably connected to an image forming apparatus such as a printer. For a printer job, a document (a page) to be printed is prepared on the user terminal, and image data of the document to be printed is transmitted as job data from the user terminal to the image forming apparatus. Then, in the image forming apparatus, a printer job is performed based on the image data received from the user terminal.

Here, there may be a case where, in preparing a document on the user terminal, the user inserts a routine image of, for example, a character string (indicating the title of the document, the name of the sender, date, and the number of the page within the document, etc.) in each of top and bottom portions of the page. Hereinafter, the routine image inserted in each of the top and bottom portions of the page may be respectively referred to as "header image" and "footer image".

Some pieces of document processing software used by being installed in a user terminal, for example, are equipped with a header/footer function. With the header/footer function, if the user designates header and footer images in advance, by the user merely generating the body of a document, the designated header and footer images are automatically inserted in previously assigned header and footer regions, respectively.

SUMMARY

According to a first aspect of the present disclosure, an image processing device includes an acquisition unit and an image processing unit. The acquisition unit acquires image data of a plurality of pages. The image processing unit performs image processing on the image data acquired by the acquisition unit. The image processing unit is configured to recognize a header region and a footer region in image data of a first page included in the image data of the plurality of pages, to set an image existing in the header region and an image existing in the footer region respectively as a reference header image and a reference footer image, and to make a similarity determination as to whether or not the reference header image and the reference footer image are each similar to another image. By making the similarity determination for each of the pages following the first page, the image processing unit searches for a similar header image resembling the reference header image and a similar footer image resembling the reference footer image, and the image processing unit deletes, from image data of the pages following the first page, image data of a page where the similar footer image exists and a region other than a region where the similar footer image exists is blank.

According to a second aspect of the present disclosure, an image forming apparatus includes the image processing device described above and a printing unit. The printing unit performs printing based on image data on which the image processing has been performed by the image processing device.

DETAILED DESCRIPTION

Hereinafter, descriptions will be given of an image processing device and an image forming apparatus according to an embodiment of the present disclosure, dealing, as an example, with a multifunction peripheral equipped with a plurality of functions including a copier function and a printer function.

(Overall Configuration of Multifunction Peripheral)

Figure 1:
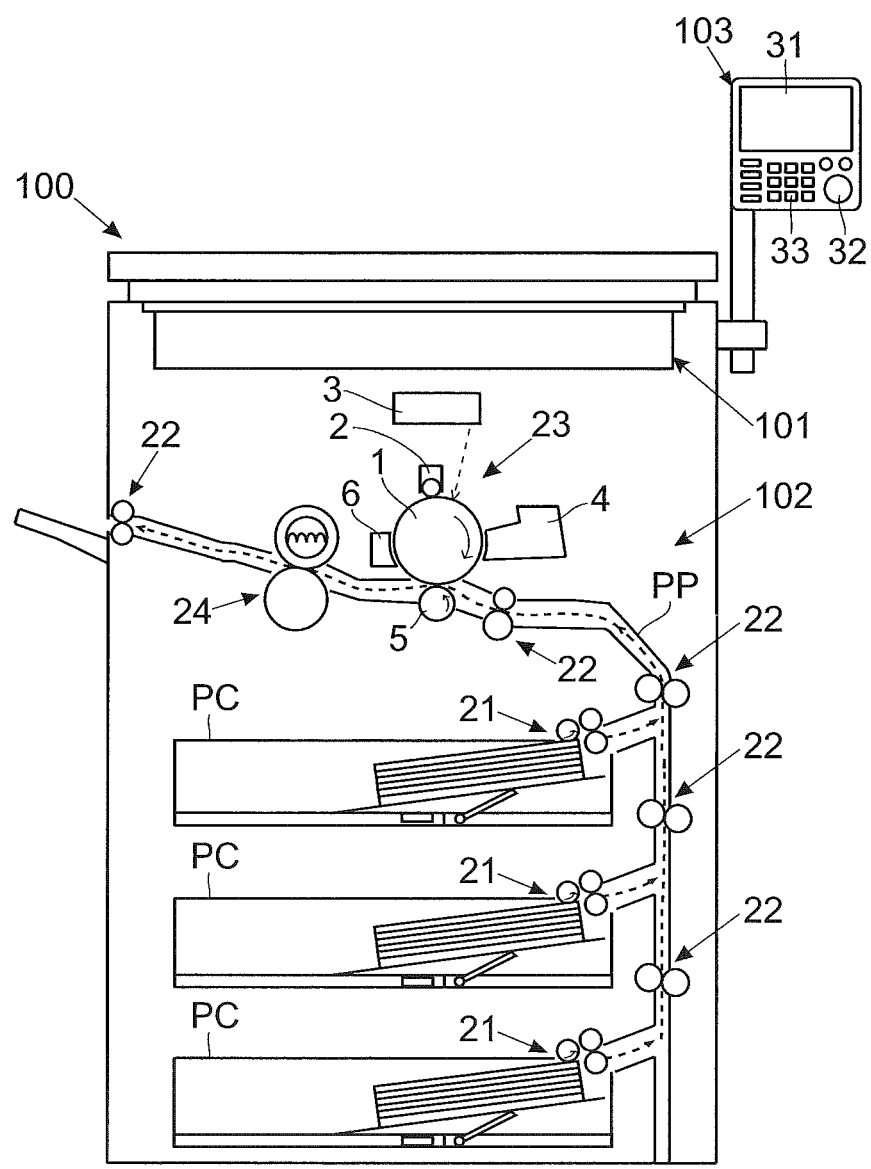
FIG. 1 is a schematic diagram of a multifunction peripheral (an image processing unit and an image forming apparatus) according to an embodiment of the present disclosure.

As shown in FIG. 1, a multifunction peripheral 100 includes an image reading unit 101, a printing unit 102, and an operation panel 103. The multifunction peripheral 100 corresponds to an "image processing device" and an "image forming apparatus".

The image reading unit 101 reads a document and generates image data. The printing unit 102 performs printing based on image data. For example, the printing by the printing unit 102 is performed based on the image data acquired by the image reading unit 101 reading the document (copier function). Or, the printing by the printing unit 102 is performed based on image data received from a user terminal 200 by a communication unit 140 which will be described later (printer function).

The printing unit 102 includes a sheet feeding unit 21, a sheet conveying unit 22, an image forming unit 23, and a fixing unit 24. The sheet feeding unit 21 supplies a sheet stored in a sheet cassette PC to a sheet conveyance path PP. The sheet conveying unit 22 conveys the sheet along the sheet conveyance path PP. The image forming unit 23 includes a photosensitive drum 1, a charging device 2, an exposure device 3, a developing device 4, a transfer roller 5, and a cleaning device 6. The image forming unit 23 forms a toner image based on image data, and transfers the toner image onto a sheet. The fixing unit 24 applies heat and pressure to the toner image transferred onto the sheet to fix the toner image on the sheet.

The operation panel 103 includes a liquid crystal display panel 31 provided with a touch panel. The liquid crystal display panel 31 displays soft keys, via which various settings are inputted, and messages. The operation panel 103 is also provided with hard keys, such as a start key 32 and ten keys 33.

<Hardware Configuration of Multifunction Peripheral>

Figure 2:
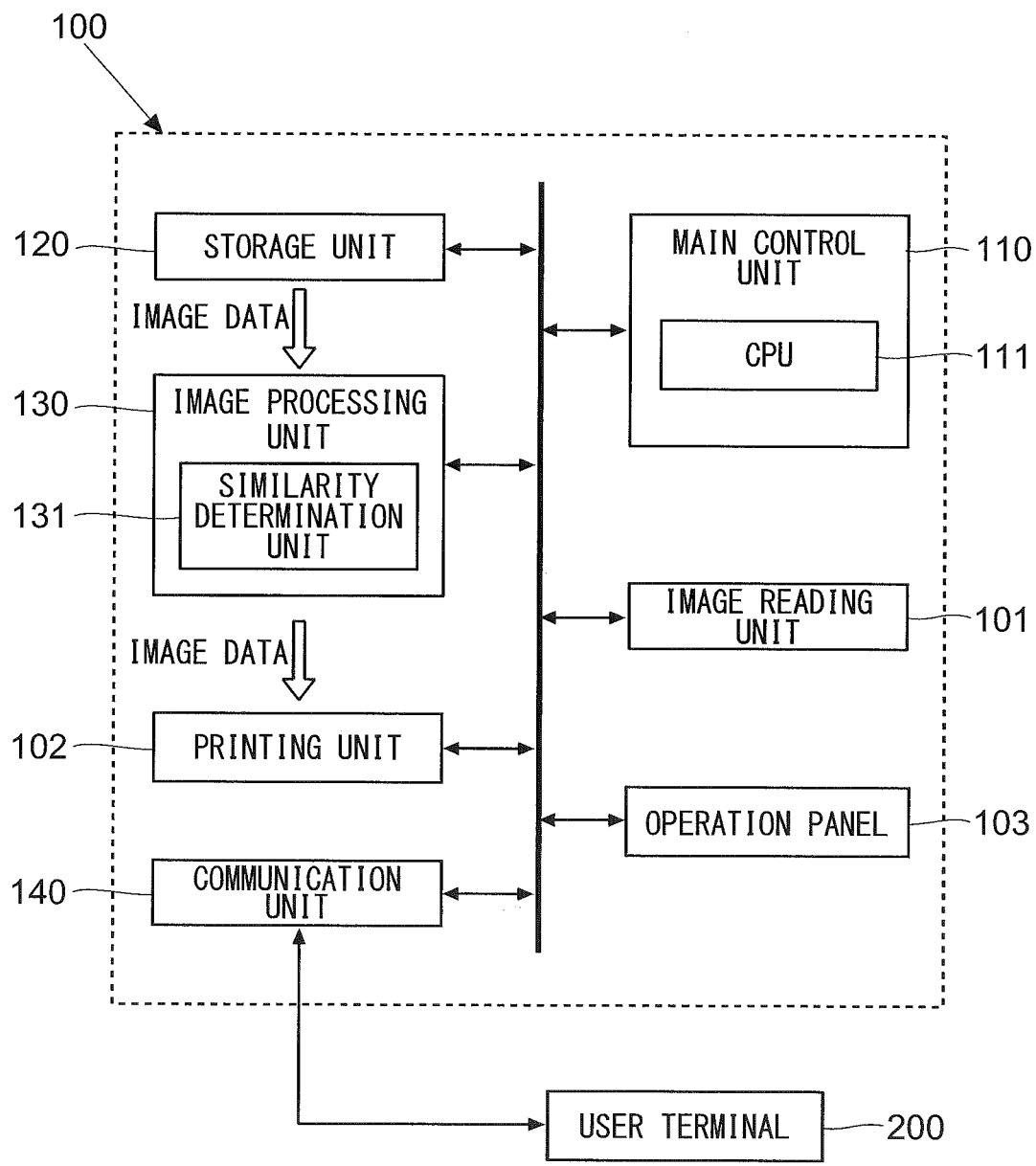
FIG. 2 is a block diagram illustrating an example of the hardware configuration of the multifunction peripheral according to the embodiment of the present disclosure.

As shown in FIG. 2, the multifunction peripheral 100 is provided with a main control unit 110 that includes a CPU 111 which is a central processing unit. The main control unit 110 is connected to a storage unit 120 and an image processing unit 130. The storage unit 120 includes, for example, a ROM, a RAM, and an HDD. For example, various kinds of programs and data are stored in the ROM, and decompressed in the RAM. The image processing unit 130 includes an ASIC, a memory, etc., dedicated for image processing. The image processing unit 130 receives an instruction from the main control unit 110, performs various kinds of image processing on image data, and generates exposure image data (that is, data for turning on/off a light emitting element of the exposure device 3). Then, the image processing unit 130 outputs the exposure image data to the printing unit 102.

Furthermore, the main control unit 110 is connected to the image reading unit 101, the printing unit 102, and the operation panel 103, and controls operations of the image reading unit 101, the printing unit 102, and the operation panel 103 based on the various programs and data stored in the storage unit 120.

Moreover, the main control unit 110 is also connected to the communication unit 140 (which corresponds to an "acquisition unit"). The communication unit 140 is communicably connected to the user terminal 200. Here, the user terminal 200, which is used by a user, is a laptop or desktop personal computer.

For example, in performance of a printer job, job data (including image data of an image to be printed) is transmitted from the user terminal 200, to be received by the communication unit 140. That is, the communication unit 140 acquires the image data from the user terminal 200. The image data that the communication unit 140 has received from the user terminal 200 is temporarily stored in the storage unit 120. Then, the image data is transmitted to the image processing unit 130, which performs image processing of various kinds on the received image data.

<Deletion of Unnecessary Page>

A piece of document processing software for creating a document or the like is installed on the user terminal 200. The user, who is going to have a printer job performed, prepares a document (pages) on the user terminal 200, and transmits the document from the user terminal 200 to the multifunction peripheral 100.

Figure 3:
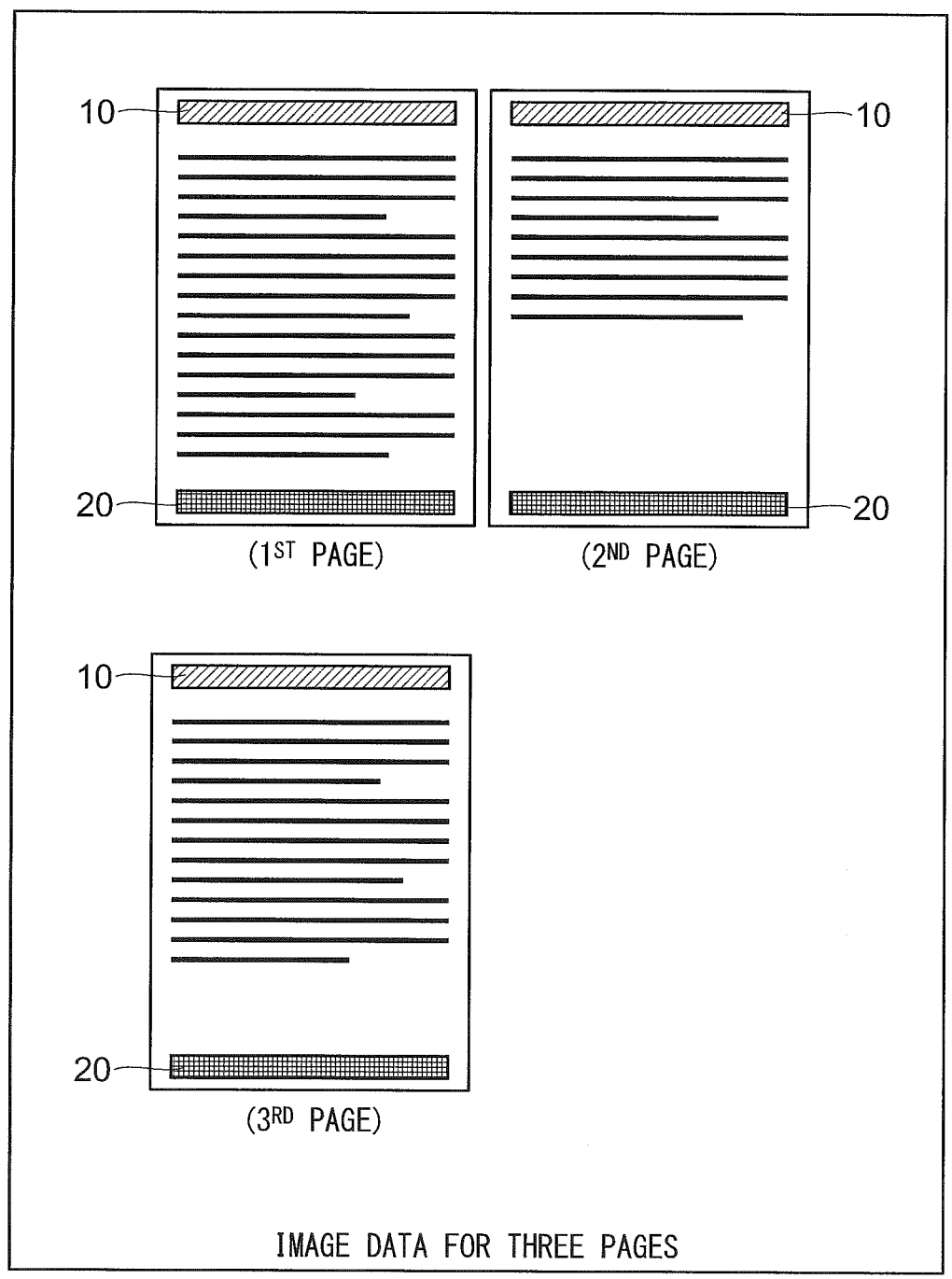
FIG. 3 is a diagram illustrating an example of image data received from a user terminal by the multifunction peripheral according to the embodiment of the present disclosure.

A document (pages) prepared by the user sometimes include routine images of routine character strings and/or the like (header and footer) inserted in the top and bottom portions of pages as illustrated in FIG. 3. In a case where the document includes a plurality of pages, such routine images are inserted in the top and bottom portions of each page. For example, the title of the document, the name of the sender, date, the serial number of the page, etc. are inserted in the top or bottom portion of each page.

In the following description, an image inserted in a top portion of a page will be referred to as a header image 10, and an image inserted in a bottom portion of the page will be referred to as a footer image 20. For convenience, the header image 10 is indicated by diagonal hatching, while the footer image 20 is indicated by cross hatching. A page body is indicated by thick lines. This also applies to the drawings that will be referred to in the following description.

Figure 4:
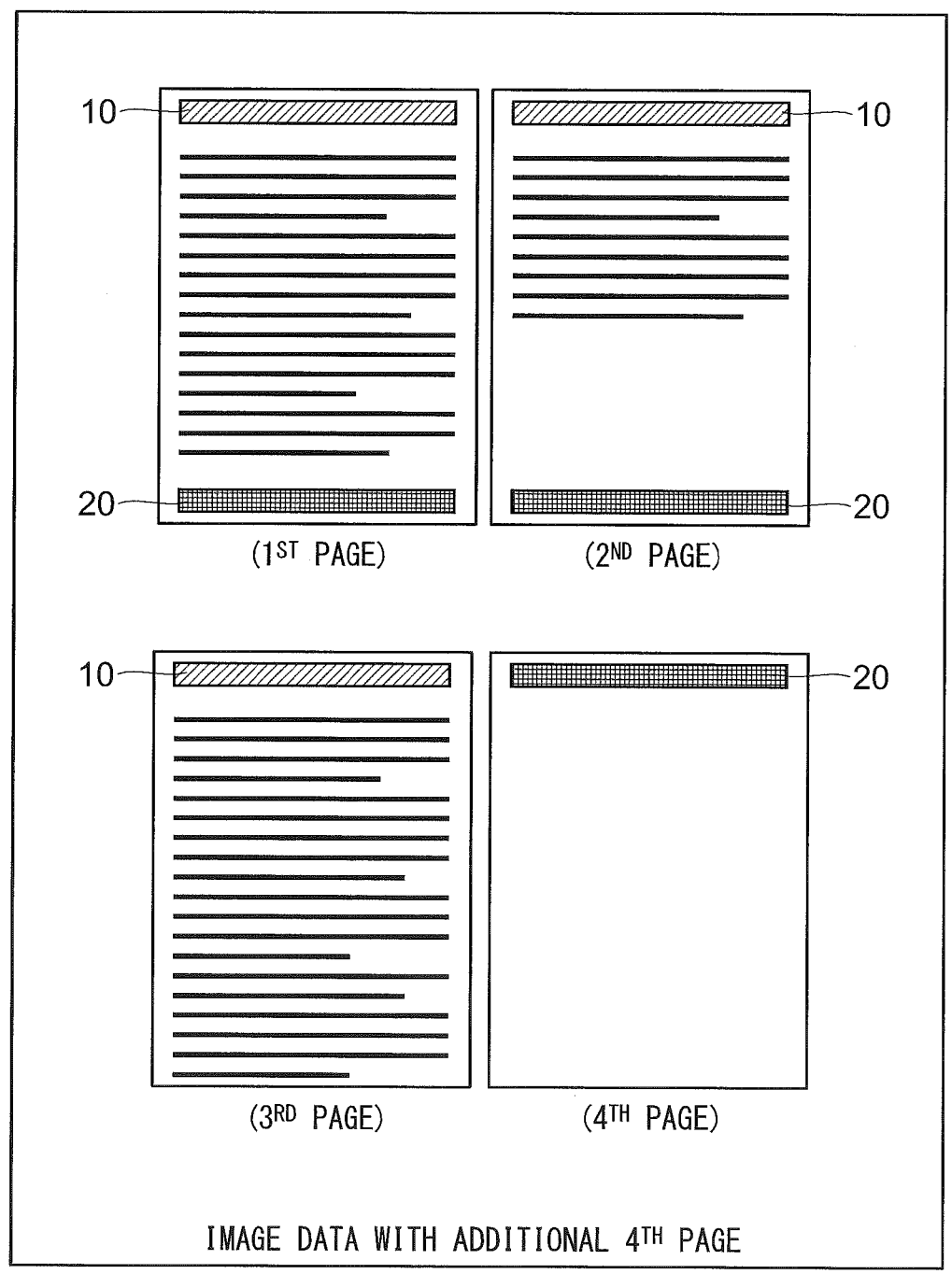
FIG. 4 is a diagram illustrating an example of the image data (including image data of unnecessary page) received from the user terminal by the multifunction peripheral according to the embodiment of the present disclosure.

Here, if the third page, which is the last page, is revised by increasing the page body, and the footer image 20 of the third page cannot be settled within the third page, then a fourth page is newly added as illustrated in FIG. 4 (thus, the fourth page is a new last page). And, the footer image 20 of the third page moves to the fourth page.

For example, let the footer image 20 of the third page move to the fourth page to push the footer image 20 out of the third page to be inserted in the top portion of the fourth page (where the header image 10 should originally be inserted). In this case, since no page body exists in the fourth page, the fourth page is unnecessary. However, in performance of a printer job, the user may sometimes fail to notice occurrence of such a state as is illustrated in FIG. 4, and may have the image data of the four pages illustrated in FIG. 4 transmitted as job data from the user terminal 200 to the multifunction peripheral 100.

If the multifunction peripheral 100 performs printing based on the image data of the four pages, a sheet (on which the fourth page is printed) is outputted as a page without a page body, on which only the footer image 20 is printed. As a result, the sheet is wasted.

To reduce occurrence of such inconvenience, according to the present embodiment, when image data (job data for a printer job) of a plurality of pages is received from the user terminal 200, an unnecessary page in which no page body exists is deleted and only pages in each of which a page body exists are printed. Hereinafter, a description will be given by dealing, as an example, with image data of the four pages illustrated in FIG. 4. In the following description, the header images 10 of all the pages are the same and the footer images 20 of all the pages are the same.

Figure 5:
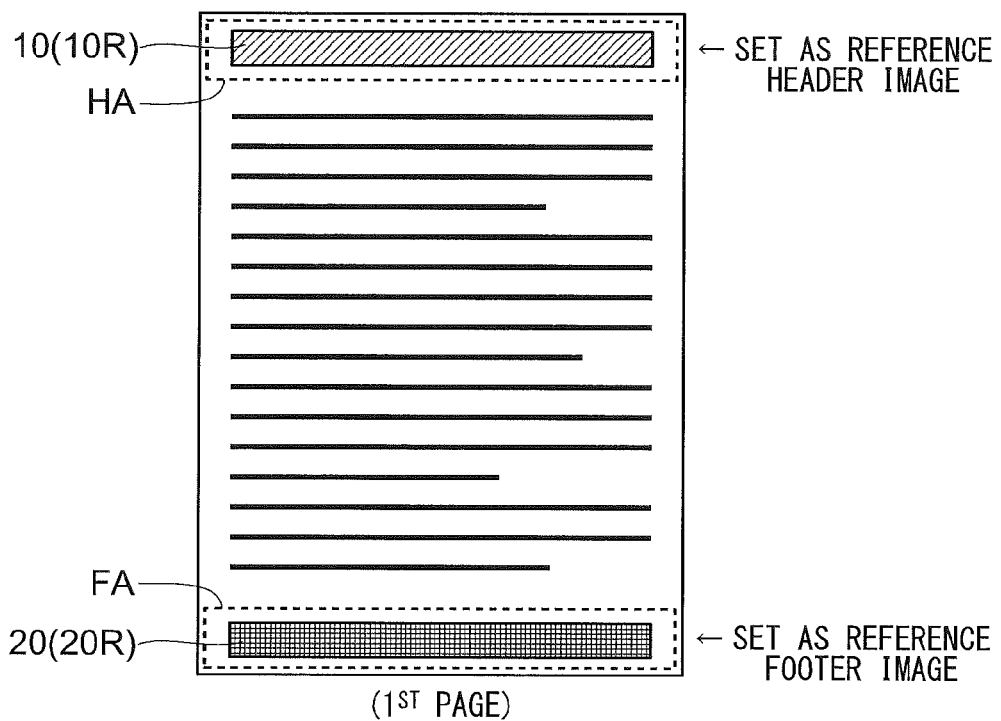
FIG. 5 is a diagram for illustrating a similarity determination (search for a similar header image and a similar footer image) made in the multifunction peripheral according to the embodiment of the present disclosure.

First, as illustrated in FIG. 5, the image processing unit 130 recognizes a header region HA and a footer region FA of the first page in the image data of the four pages. Then, the image processing unit 130 sets an image existing in the header region HA (the header image 10) as a reference header image 10R, and also sets an image existing in the footer region FA (the footer image 20) as a reference footer image 20R. The image processing unit 130 also stores the reference header image 10R and the reference footer image 20R in a memory.

Then, the image processing unit 130 makes a similarity determination for each of the pages following the first page. For example, the image processing unit 130 includes a similarity determination unit 131 (see FIG. 2) for making a similarity determination. In the similarity determination, a determination is made as to whether or not the reference header image 10R and the reference footer image 20R (which may be collectively referred to as a reference image) are each similar to another image.

For example, the image processing unit 130 (the similarity determination unit 131) extracts an image from the header region HA and the footer region FA of a page for which the similarity determination is to be performed, and the image processing unit 130 sets the extracted image as a target image, which becomes a target of the similarity determination. Then, the image processing unit 130 compares the reference image with the target image to obtain a similarity degree that indicates to what extent the reference image and the target image are similar to each other, and makes a judgment on whether the similarity degree satisfies a predetermined condition. There is no particular limitation, but when the similarity degree between the reference image and the target image is equal to or higher than a previously determined threshold (for example, 80% to 90%), the image processing unit 130 judges that the similarity degree satisfies the predetermined condition. When the similarity degree between the reference image and the target image satisfies the predetermined condition, the image processing unit 130 judges that the reference image and the target image are similar to each other.

In making the similarity determination, the image processing unit 130 generates a color histogram of each of the reference image and the target image, and obtains a color similarity degree that indicates to what extent the color histogram of the reference image and the color histogram of the target image are similar to each other. Then, when the color similarity degree between the reference image and the target image is equal to or lower than a previously determined threshold (for example, 80% to 90%), the image processing unit 130 judges that the predetermined condition is not satisfied. That is, the image processing unit 130 judges that the reference image and the target image are not similar to each other.

By making such a similarity determination, the image processing unit 130 searches the pages following the first page, in order starting from the second page, for a similar header image resembling the reference header image 10R and a similar footer image resembling the reference footer image 20R. The image processing unit 130 also makes a judgment on whether or not a page body exists in each page.

Figure 6:
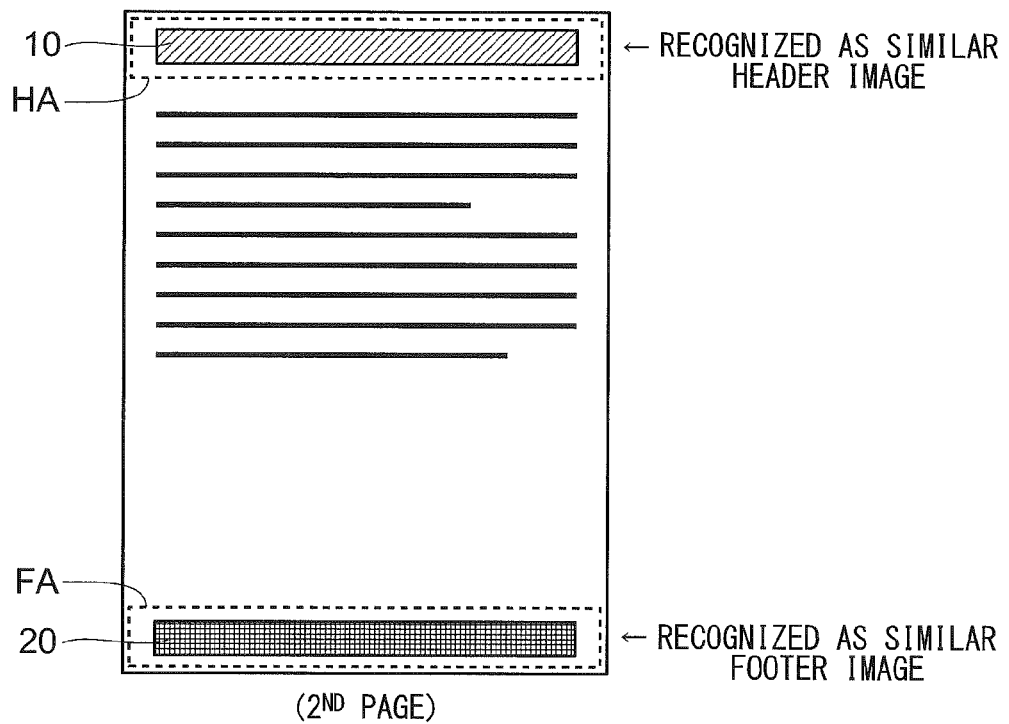
FIG. 6 is a diagram for illustrating the similarity determination (search for a similar header image and a similar footer image) made in the multifunction peripheral according to the embodiment of the present disclosure.

For example, as illustrated in FIG. 6, in the second page, there exist a header image 10 and a footer image 20 respectively in the header region HA and the footer region FA. Thus, the image processing unit 130 recognizes the image existing in the header region HA (the header image 10) as a similar header image, and recognizes the image existing in the footer region FA (the footer image 20) as a similar footer image. Further, since a page-body image exists between the header region HA and the footer region FA in the second page, the image processing unit 130 judges that a region other than regions where the similar header image and the similar footer image exist is not blank. Thus, as for a page where a similar header image and a similar footer image exist and a region other than regions where the similar header image and the similar footer image exist is not blank, the image processing unit 130 does not delete the image data of the page.

Figure 7:
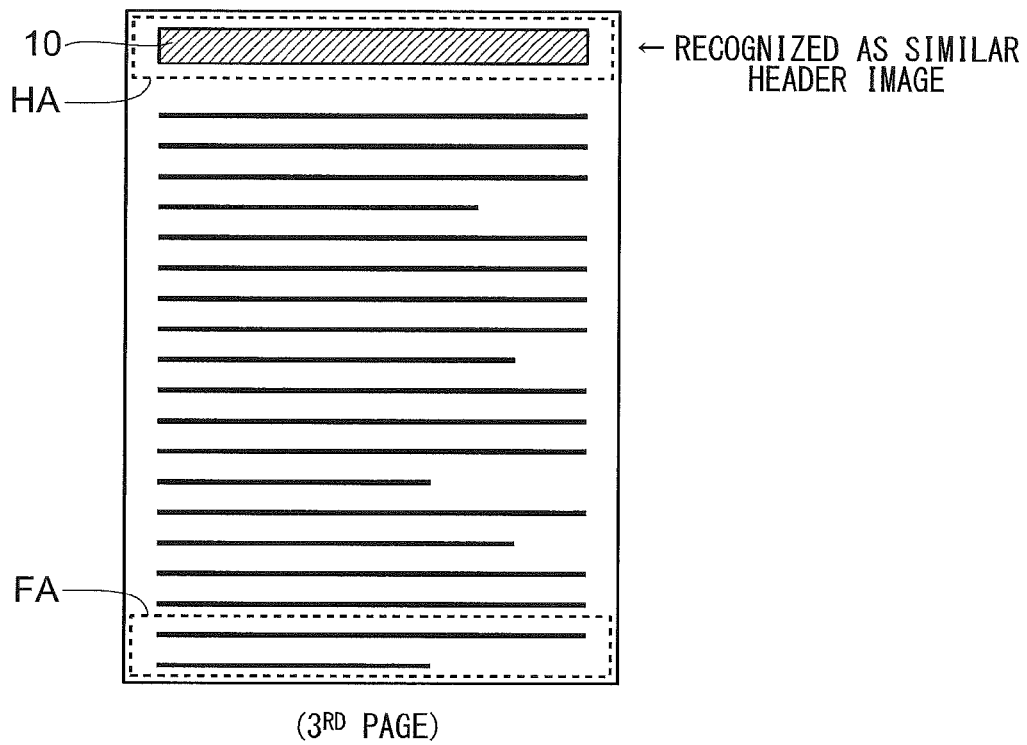
FIG. 7 is a diagram for illustrating the similarity determination (search for a similar header image and a similar footer image) made in the multifunction peripheral according to the embodiment of the present disclosure.

Further, in the third page, as illustrated in FIG. 7, a header image 10 exists in the header region HA. Thus, the image processing unit 130 recognizes the image (the header image 10) in the header region HA as a similar header image. Here, since no footer image 20 exists in the third page, the image processing unit 130 judges that no similar footer image exists in the third page. Furthermore, since a page-body image exists in a region below the header region HA in the third page, the image processing unit 130 judges that a region other than the region where the similar header image exists is not blank. Thus, even if no similar footer image exists in a page, if a similar header image exists in the page and a region other than the region where the header image exists is not blank, the image processing unit 130 does not delete the image data of the page.

Figure 8:
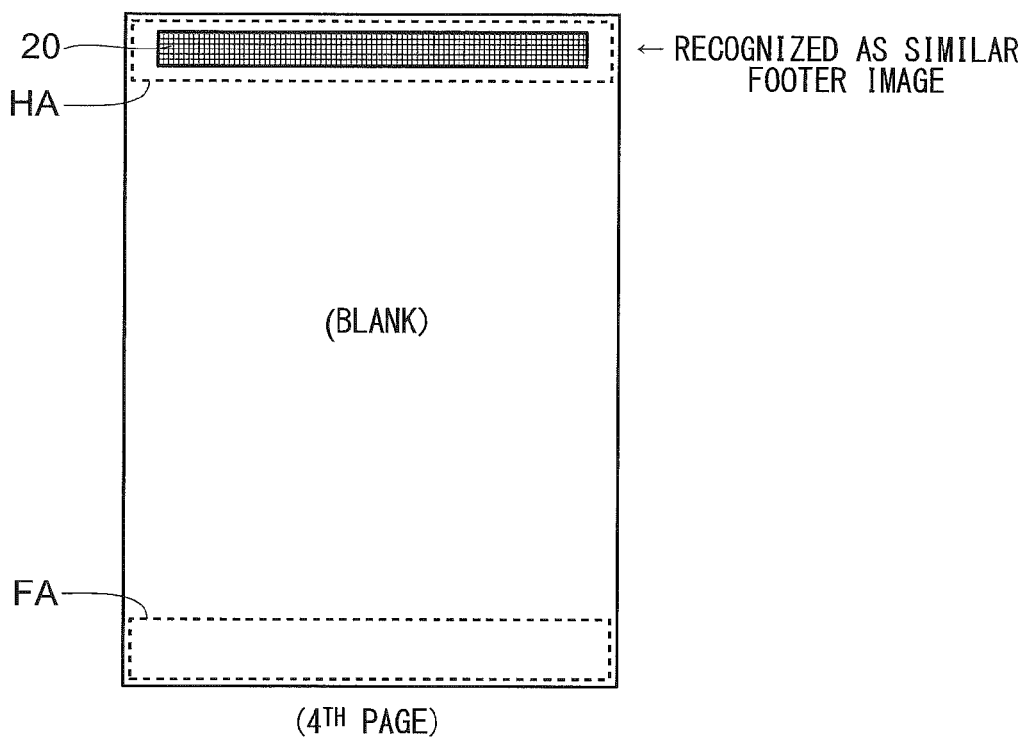
FIG. 8 is a diagram for illustrating the similarity determination (search for a similar header image and a similar footer image) made in the multifunction peripheral according to the embodiment of the present disclosure.

Also, in the fourth page, as illustrated in FIG. 8, there exists a footer image 20 in the header region HA. Thus, the image processing unit 130 recognizes the image existing in the header region HA (the footer image 20) as a similar footer image.

Figure 9:
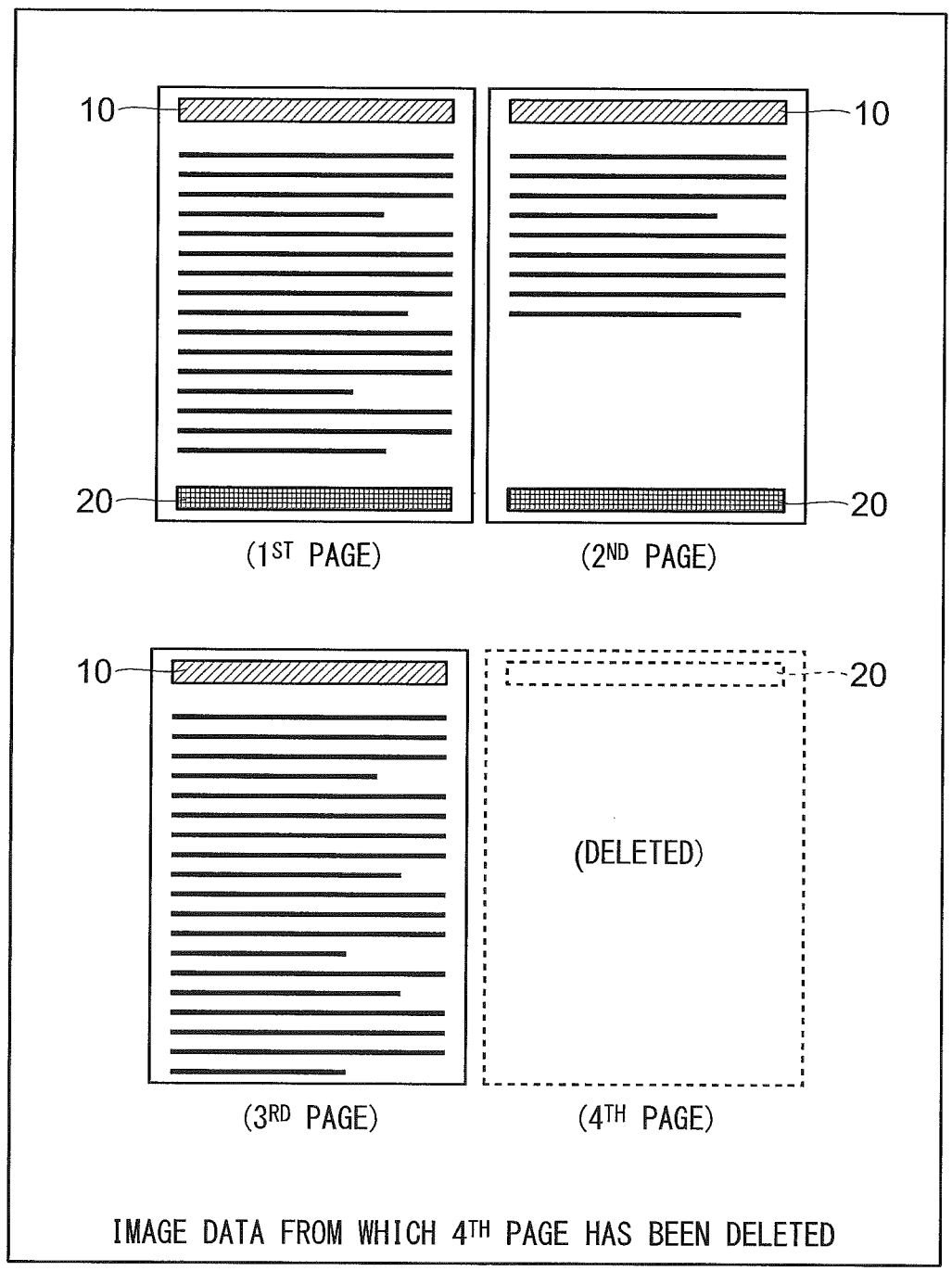
FIG. 9 is a diagram illustrating an example of the image data from which an unnecessary page is deleted in the multifunction peripheral according to the embodiment of the present disclosure.

Here, since no header image 10 exists in the fourth page, the image processing unit 130 judges that no similar header image exists in the fourth page. Further, since no page-body image exists in the fourth page, either, the image processing unit 130 judges that a region of the fourth page other than the region where the similar footer image exists is blank. Thus, as for a page where only a similar footer image exists and a region other than the region where the similar footer image exists is blank, the image processing unit 130 deletes the image data of the page (see FIG. 9). That is, the image processing unit 130 judges that the fourth page is an unnecessary page (a page to be deleted).

As a result, the pages printed by the printing unit 102 will be the first, second, and third pages. That is, since the unnecessary fourth page is not going to be printed, no sheet is going to be output with an unnecessary page printed thereon.

Figure 10:
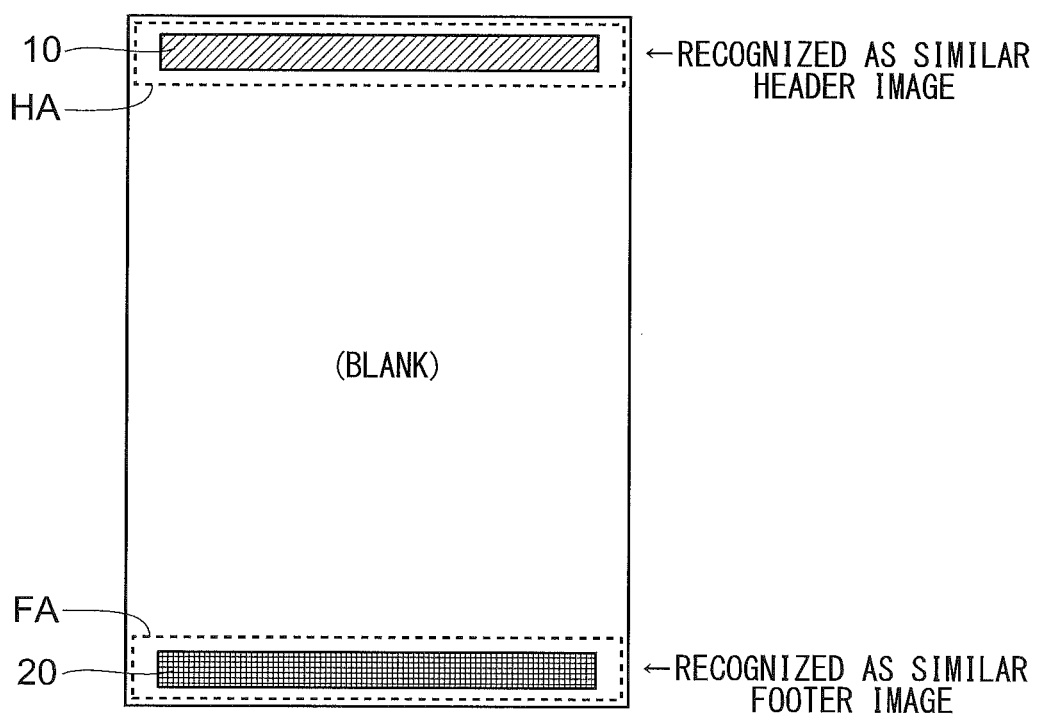
FIG. 10 is a diagram for illustrating the similarity determination (search for a similar header image and a similar footer image) made in the multifunction peripheral according to the embodiment of the present disclosure.

Here, there may be a case where such a page as is illustrated in FIG. 10 is prepared by the user. In the page illustrated in FIG. 10, there exist a header image 10 and a footer image 20 respectively in the header region HA and the footer region FA. However, there exists no page-body image.

In the case where such a page as is illustrated in FIG. 10 is prepared by the user, the image processing unit 130 recognizes the image existing in the header region HA (the header image 10) as a similar header image, and recognizes the image existing in the footer region FA (the footer image 20) as a similar footer image. Here, no page-body image exists in the page illustrated in FIG. 10. Thus, the image processing unit 130 judges that a region other than regions where the similar header image and the similar footer image exist is blank. As for a page where a similar header image and a similar footer image exist but a region other than the regions where the similar header image and the similar footer image exist is blank, the image processing unit 130 deletes the image data of the page (that is, the image processing unit 130 judges that the page is unnecessary).

Figure 11:
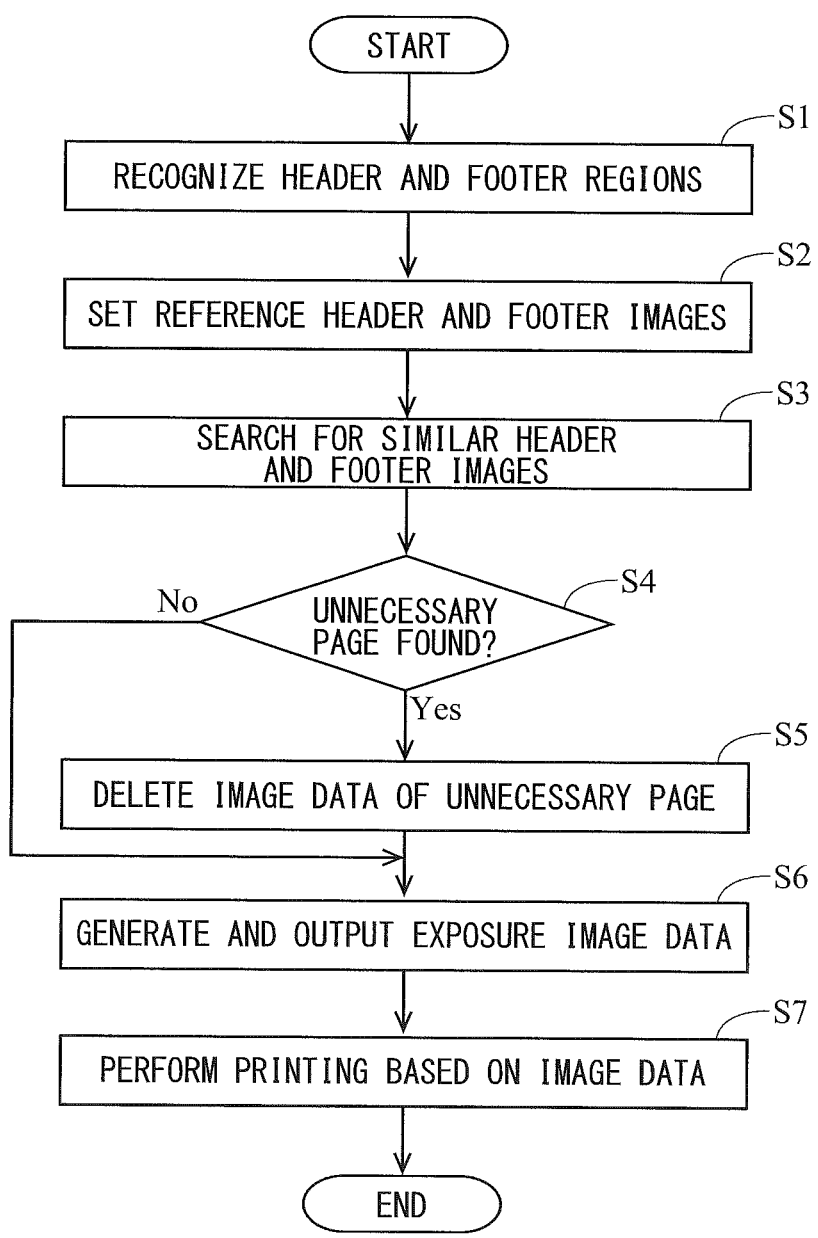
FIG. 11 is a flow chart for illustrating a flow of processing performed when the multifunction peripheral according to the embodiment of the present disclosure has received the image data (job data) from the user terminal.

With reference to a flow chart illustrated in FIG. 11, a description will be given below on a flow of processing performed when job data (image data of a plurality of pages) of a printer job is received. The flow chart illustrated in FIG. 11 starts when the multifunction peripheral 100 (the communication unit 140) receives job data (image data of a plurality of pages) of a printer job from the user terminal 200.

In step S1, the image processing unit 130 recognizes a header region HA and a footer region FA in image data of a first page included in the image data of the plurality of pages. Then, in step S2, the image processing unit 130 sets an image existing in the header region HA as a reference header image 10R, and also sets an image existing in the footer region FA as a reference footer image 20R.

Next, in step S3, the image processing unit 130 makes a similarity determination for each of pages following the first page, and thereby searches each of the pages following the first page for a similar header image resembling the reference header image 10R and a similar footer image resembling the reference footer image 20R. Then, in step S4, the image processing unit 130 makes a judgment on whether or not there exists an unnecessary page (a page to be deleted). When the image processing unit 130 finds an unnecessary page as a result of the judgment, the flow shifts to step S5.

In step S5, the image processing unit 130 deletes the unnecessary page. Thereafter, the flow shifts to step S6. The flow shifts to step S6 also in a case where the image processing unit 130 finds no unnecessary page in step S4. That is, in this case, no page is deleted.

When the flow shifts to step S6, the image processing unit 130 generates exposure image data and outputs the exposure image data to the printing unit 102. Then, in step S7, the printing unit 102 performs printing. Here, in the case where the flow has shifted from step S5 to step S6, since the unnecessary data has been deleted, no exposure image data corresponding to the unnecessary data is generated (and outputted to the printing unit 102).

The multifunction peripheral 100 (the image processing device and the image forming apparatus) of the present embodiment includes the communication unit 140 (the acquisition unit) that acquires image data of a plurality of pages, and the image processing unit 130 which performs image processing on the image data that the communication unit 140 has acquired. The image processing unit 130 is configured to recognize a header region HA and a footer region FA of a first page included in the image data of the plurality of pages, to set an image existing in the header region HA and an image existing in the footer region FA as a reference header image 10R and a reference footer image 20R, respectively, and to make a similarity determination as to whether or not the reference header image 10R and the reference footer image 20R are similar to other images. The image processing unit 130 makes the similarity determination for each of pages following the first page, and thereby, the image processing unit 130 searches for a similar header image resembling the reference header image 10R and a similar footer image resembling the reference footer image 20R, and the image processing unit 130 deletes, from image data of the pages following the first page, image data of a page where a similar footer image exists and a region other than the region where the similar footer image exists is blank.

According to the configuration of the present embodiment, the image processing unit 130 searches the image data of the pages following the first page for a page where only a similar footer image exists and a region other than the region where the similar footer image exists is blank. That is, the image processing unit 130 searches for an unnecessary page (a page to be deleted) where no page body exists. In a case where an unnecessary page exists, the image processing unit 130 deletes image data of the unnecessary page. Thereby, it is possible to reduce printing performed based on image data of an unnecessary page.

Furthermore, according to the present embodiment, as described above, the image processing unit 130 also deletes, from the image data of the pages following the first page, image data of a page where a similar header image and a similar footer image exist and a region other than the regions where the similar header image and the similar footer image exist is blank. This configuration makes it possible to securely reduce printing performed based on image data of an unnecessary page.

Moreover, according to the present embodiment, as described above, the image processing unit 130 uses the reference header image 10R as a reference image and uses the reference footer image 20R as a reference image. And, in the similarity determination, the image processing unit 130 obtains a similarity degree that indicates to what extent a target image as a target of the similarity determination and the reference image are similar to each other, and when the similarity degree satisfies a predetermined condition, the image processing unit 130 judges that the reference image and the target image are similar to each other. This configuration makes it easy to search for a similarity header image and a similarity footer image.

Furthermore, according to the present embodiment, as described above, when making the similarity determination, the image processing unit 130 generates a color histogram of each of the reference image and the target image, and the image processing unit 130 obtains a color similarity degree that indicates to what extent the color histograms of the reference image and the target image are similar to each other, and at least when the color similarity degree is equal to or lower than a previously determined threshold, the image processing unit 130 judges that a predetermined condition is not satisfied. With this configuration, when the color of the reference image (the color of the image of a character string and/or the like) and the color of the target image are different from each other, the reference image and the target image are not judged to be similar to each other. This helps improve the accuracy of the similarity determination.

It should be understood that the embodiments disclosed herein are merely illustrative in all respects, and should not be interpreted restrictively. The range of the present disclosure is shown not by the above descriptions of embodiments but the scope of claims for patent, and it is intended that all modifications within the meaning and range equivalent to the scope of claims for patent are included.

What is claimed is:

1. An image processing device comprising:
an acquisition unit that acquires image data of a plurality of pages; and
an image processing unit that performs image processing on the image data acquired by the acquisition unit, wherein
the image processing unit is configured to recognize a header region and a footer region in image data of a first page included in the image data of the plurality of pages, to set an image existing in the header region and an image existing in the footer region respectively as a reference header image and a reference footer image, and to make a similarity determination as to whether the reference header image and the reference footer image are each similar to another image, and
by making the similarity determination for each of the pages following the first page, the image processing unit searches for a similar header image resembling the reference header image and a similar footer image resembling the reference footer image, and
the image processing unit deletes, from image data of the pages following the first page, image data of a page where the similar footer image exists and a region other than a region where the similar footer image exists is blank.

2. The image processing device according to claim 1, wherein
the image processing unit deletes, from image data of the pages following the first page, image data of a page where the similar header image and the similar footer image exist and a region other than regions where the similar header image and the similar footer image exist is blank.

3. The image processing device according to claim 1, wherein the image processing unit uses the reference header image as a reference image in searching for the similar header image, the image processing unit uses the reference footer image as the reference image in searching for the similar footer image, and in making the similarity determination, the image processing unit obtains a similarity degree that indicates to what extent a target image which is a target of the similarity determination and the reference image are similar to each other, and when the similarity degree satisfies a predetermined condition, the image processing unit judges that the reference image and the target image are similar to each other.

4. The image processing device according to claim 3, wherein in making the similarity determination, the image processing unit generates a color histogram of the reference image and a color histogram of the target image, and obtains a color similarity degree that indicates to what extent the color histogram of the reference image and the color histogram of the target image are similar to each other, and at least when the color similarity degree is equal to or lower than a previously determined threshold, the image processing unit judges that the predetermined condition is not satisfied.

5. An image forming apparatus comprising:

the image processing device according to claim 1; and a printing unit that performs printing based on image data on which image processing has been performed by the image processing device.

* * * * *